(12) United States Patent
Elliot et al.

(10) Patent No.: US 8,905,278 B2
(45) Date of Patent: Dec. 9, 2014

(54) CAR TOP CARRIER

(75) Inventors: John M. Elliot, Beaverton, OR (US);
Dave Condon, Wilsonville, OR (US)

(73) Assignee: Yakima Products, Inc., Beaverton, OR (US)

( * ) Notice: Subject to any disclaimer, the term of this patent is extended or adjusted under 35 U.S.C. 154(b) by 672 days.

(21) Appl. No.: 13/253,875

(22) Filed: Oct. 5, 2011

(65) Prior Publication Data
US 2012/0118926 A1 May 17, 2012

Related U.S. Application Data

(60) Provisional application No. 61/390,103, filed on Oct. 5, 2010, provisional application No. 61/454,403, filed on Mar. 18, 2011.

(51) Int. Cl.
*B60R 9/055* (2006.01)

(52) U.S. Cl.
CPC ................... *B60R 9/055* (2013.01)
USPC ........... 224/328; 224/319; 224/315; 292/194; 292/48; 70/159

(58) Field of Classification Search
CPC .................................................. B60R 9/055
USPC ................... 224/309, 315, 319, 328, 330; 292/197–199, 240, 44, 45, 50, 54, 292/95–99, 194, 200; 70/63, 69, 72, 81–83, 70/158, 160, 161, 167, 168
See application file for complete search history.

(56) References Cited

U.S. PATENT DOCUMENTS

| | | | |
|---|---|---|---|
| 1,313,687 A | 8/1919 | Hellweg |
| 2,212,156 A | 8/1940 | Erdley |
| 2,483,947 A | 10/1949 | Turner |
| 2,604,178 A | 7/1952 | Steinmayer |
| 2,631,346 A | 3/1953 | Wengen et al. |
| 2,679,993 A | 6/1954 | Christophersen |
| 2,788,929 A | 4/1957 | Gallagher |
| 2,891,296 A | 6/1959 | Darde |
| 2,974,985 A | 3/1961 | Speeuwenberg |
| 3,008,177 A | 11/1961 | Wooten, Jr. |
| 3,366,295 A | 1/1968 | Nygaard |
| 3,528,691 A | 9/1970 | Matich, Jr. |
| 3,581,962 A | 6/1971 | Osborn |
| 3,640,423 A | 2/1972 | Parker et al. |

(Continued)

FOREIGN PATENT DOCUMENTS

| | | |
|---|---|---|
| AT | 376936 B | 1/1985 |
| DE | 2804588 A1 | 8/1979 |

(Continued)

OTHER PUBLICATIONS

415 Load Carriers Instructions, Instruction sheet for Thule Car Rack Systems, date unknown, 2 pages.

*Primary Examiner* — Adam Waggenspack
*Assistant Examiner* — Todd Anderson
(74) *Attorney, Agent, or Firm* — Kolisch Hartwell, P.C.

(57) ABSTRACT

A cargo box is configured for mounting on crossbars on top of a vehicle. The cargo box includes a control assembly for operating a latch assembly on one side of the cargo box. The control assembly includes a toggle switch which may be enabled or disabled by operation of a lock device.

14 Claims, 8 Drawing Sheets

(56) References Cited

U.S. PATENT DOCUMENTS

| | | | |
|---|---|---|---|
| 3,677,196 A | 7/1972 | Schuller | |
| 3,784,143 A | 1/1974 | Andersen et al. | |
| 3,971,186 A | 7/1976 | Havelka et al. | |
| 4,217,999 A | 8/1980 | Forsman | |
| 4,249,684 A | 2/1981 | Miller et al. | |
| 4,274,568 A | 6/1981 | Bott | |
| 4,378,898 A | 4/1983 | Smeenge et al. | |
| 4,406,387 A | 9/1983 | Rasor | |
| 4,420,105 A | 12/1983 | Nepper | |
| 4,441,344 A | 4/1984 | Kurpershoek | |
| 4,449,656 A | 5/1984 | Wouden | |
| 4,460,116 A | 7/1984 | Bott | |
| 4,496,089 A | 1/1985 | Eklund | |
| 4,503,584 A | 3/1985 | Malchow | |
| 4,586,638 A | 5/1986 | Prescott et al. | |
| 4,640,450 A | 2/1987 | Gallion et al. | |
| 4,688,706 A | 8/1987 | Thulin | |
| 4,752,022 A | 6/1988 | Thulin | |
| D299,913 S | 2/1989 | Arvidsson | |
| 4,877,169 A | 10/1989 | Grim | |
| 4,911,348 A | 3/1990 | Rasor et al. | |
| 4,993,615 A | 2/1991 | Arvidsson | |
| 4,995,538 A | 2/1991 | Marengo | |
| 5,038,988 A | 8/1991 | Thulin | |
| 5,104,020 A | 4/1992 | Arvidsson et al. | |
| 5,176,350 A | 1/1993 | McQuistian | |
| 5,226,570 A | 7/1993 | Pedrini | |
| 5,257,710 A | 11/1993 | Cropley | |
| 5,275,320 A | 1/1994 | Duemmler | |
| 5,280,848 A | 1/1994 | Moore | |
| 5,314,104 A | 5/1994 | Lee | |
| 5,320,264 A | 6/1994 | Weir | |
| 5,366,128 A | 11/1994 | Grim | |
| 5,366,195 A | 11/1994 | Arvidsson | |
| 5,383,589 A | 1/1995 | Tracy et al. | |
| 5,397,042 A | 3/1995 | Pedrini | |
| 5,419,479 A | 5/1995 | Evels et al. | |
| 5,426,827 A | 6/1995 | Tracy et al. | |
| 5,492,258 A | 2/1996 | Brunner | |
| 5,499,762 A | 3/1996 | Lee | |
| 5,535,930 A | 7/1996 | Lee | |
| 5,546,705 A | 8/1996 | Hirtsiefer | |
| 5,556,221 A | 9/1996 | Brunner | |
| 5,582,313 A | 12/1996 | Envall | |
| 5,582,316 A | 12/1996 | Masayoshi et al. | |
| 5,615,818 A | 4/1997 | Linden | |
| 5,647,652 A | 7/1997 | Zalewski et al. | |
| 5,762,244 A | 6/1998 | Wagner et al. | |
| 5,823,411 A | 10/1998 | Gronwoldt et al. | |
| 5,845,828 A | 12/1998 | Settelmayer | |
| 5,947,356 A | 9/1999 | Delong | |
| 6,145,719 A | 11/2000 | Robert | |
| 6,273,311 B1 | 8/2001 | Pedrini | |
| 6,296,161 B1 | 10/2001 | Van der Feen et al. | |
| 6,296,278 B1 | 10/2001 | Zupancic et al. | |
| 6,463,627 B1 | 10/2002 | Hirtsiefer | |
| 6,581,813 B2 | 6/2003 | Bove et al. | |
| 6,681,971 B2 | 1/2004 | Laverack et al. | |
| 6,755,449 B2 * | 6/2004 | Weinerman et al. | 292/198 |
| 6,789,357 B1 | 9/2004 | McCullough | |
| 6,918,521 B2 | 7/2005 | Settelmayer et al. | |
| 7,040,675 B1 | 5/2006 | Ott et al. | |
| 7,352,566 B2 | 4/2008 | Huang et al. | |
| 7,416,098 B2 | 8/2008 | Settelmayer et al. | |
| 7,503,470 B2 | 3/2009 | Settelmayer et al. | |
| 7,740,157 B2 | 6/2010 | Fisher et al. | |
| 8,051,688 B2 * | 11/2011 | Soma | 70/162 |
| 2002/0030074 A1 | 3/2002 | Bove et al. | |
| 2004/0256427 A1 | 12/2004 | Settelmayer et al. | |
| 2005/0145639 A1 | 7/2005 | Viklund et al. | |
| 2009/0090145 A1 * | 4/2009 | Engelberth | 70/159 |
| 2013/0284778 A1 * | 10/2013 | Hubbard et al. | 224/282 |

FOREIGN PATENT DOCUMENTS

| | | | |
|---|---|---|---|
| DE | 3605479 A1 | | 9/1986 |
| DE | 3709335 A1 | | 10/1988 |
| DE | 3837209 C1 | | 3/1990 |
| DE | 19526477 C1 | | 9/1996 |
| DE | 19742253 C1 | | 5/1999 |
| EP | 1231112 B1 | | 8/2002 |
| FR | 2840571 B1 | | 11/2004 |
| JP | 7172452 A | | 7/1995 |
| JP | 8258630 A | | 10/1996 |
| JP | 11291832 A | | 10/1999 |
| JP | 2000213220 A | * | 8/2000 |
| JP | 2003089329 A | | 3/2003 |
| WO | 9711865 A1 | | 4/1997 |
| WO | 2004067326 A2 | | 8/2004 |
| WO | WO 2006053597 A1 | * | 5/2006 |
| WO | WO 2007128363 A1 | * | 11/2007 |
| WO | WO 2010073631 A1 | * | 7/2010 |
| WO | WO 2012048051 A2 | * | 4/2012 |

* cited by examiner

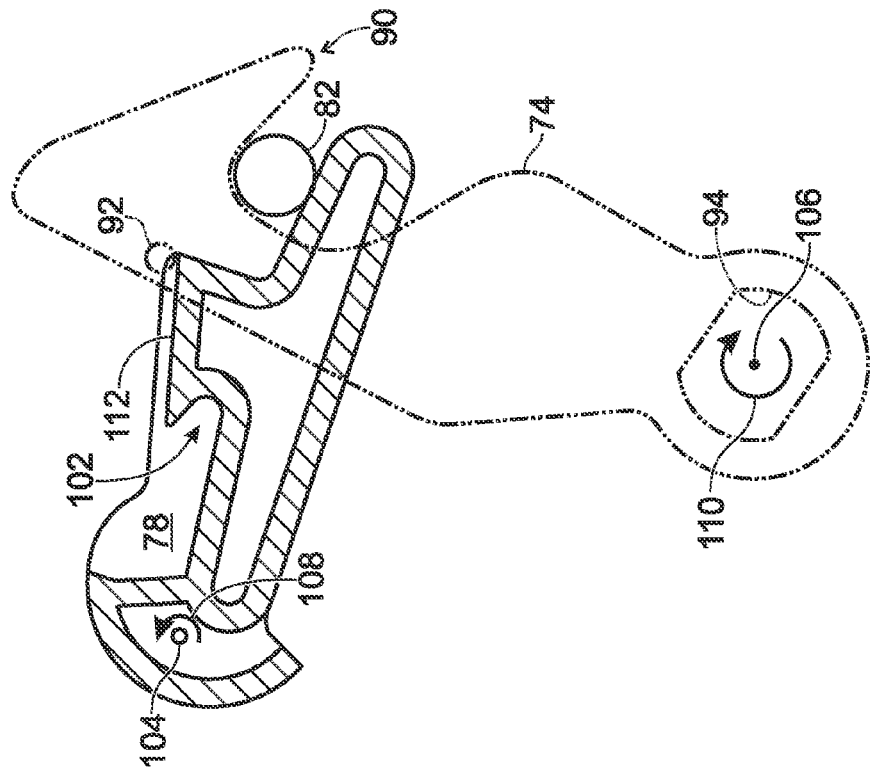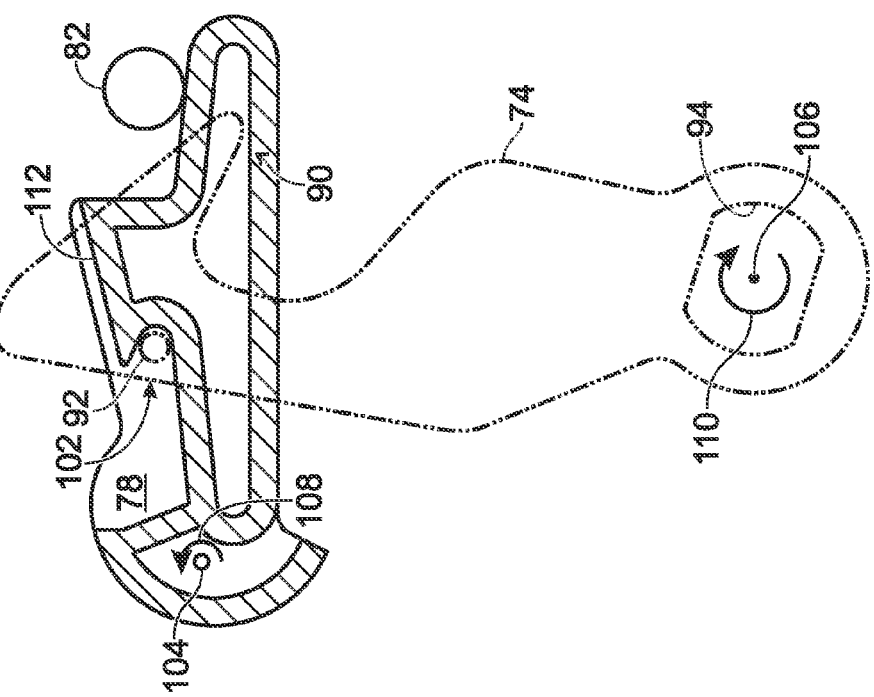

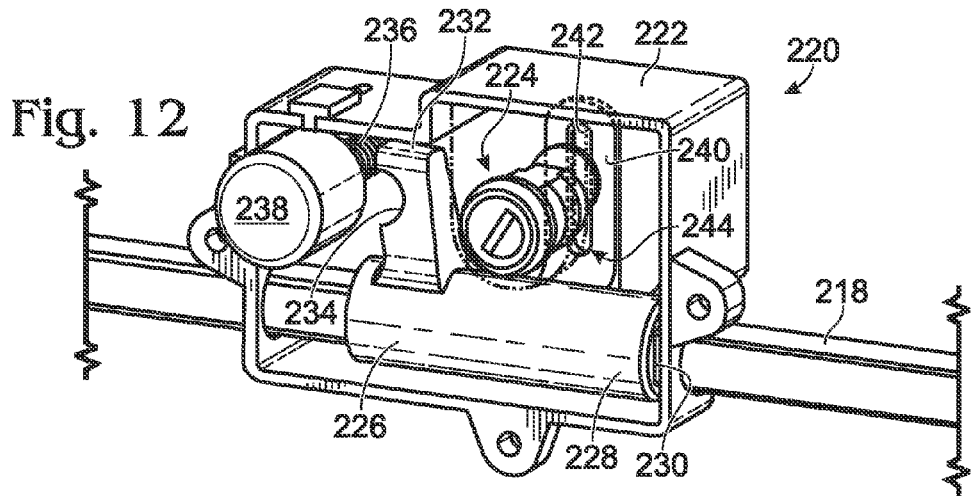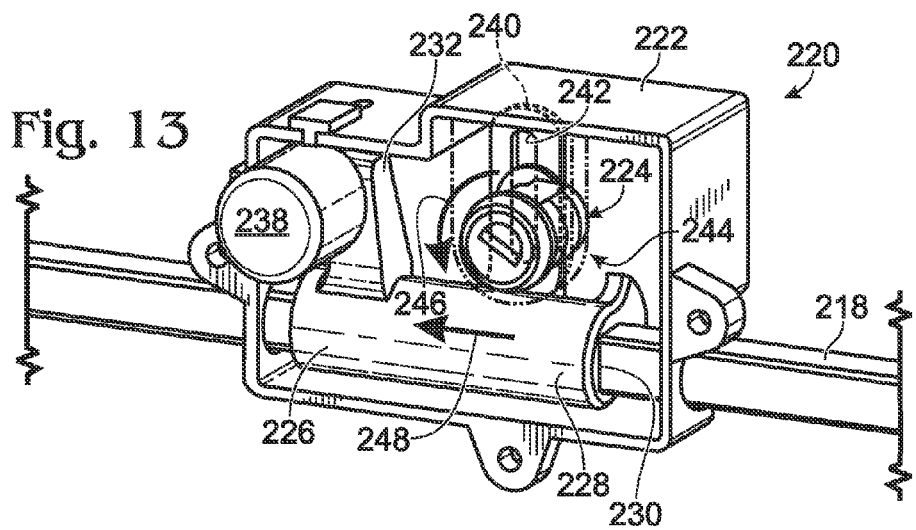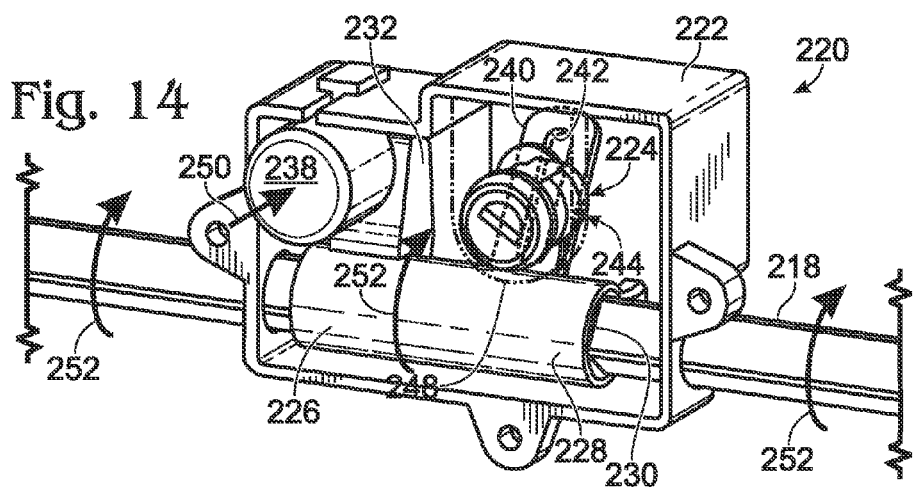

CAR TOP CARRIER

CROSS-REFERENCE TO RELATED APPLICATION(S)

This application claims priority under 35 U.S.C. §119(e) to U.S. Provisional Patent Application Ser. No. 61/390,103 filed Oct. 5, 2010 and Ser. No. 61/454,403 filed on Mar. 18, 2011. The complete disclosures of each application are hereby incorporated by reference in their entireties for all purposes.

FIELD OF THE DISCLOSURE

This disclosure relates to car top carriers. More specifically, this disclosure relates to car top carriers having one or more latches and a control assembly for securing closure of a car top carrier.

INTRODUCTION

Enclosed vehicle top carriers such as boxes or trunks have become quite popular for carrying cargo. As fuel becomes more expensive, vehicles become smaller, and interior cargo space decreases. The amount of gear and equipment that people carry on their travels also keeps increasing, making the demand for reliable, easy-to-use external cargo carriers even greater. Enclosed carriers are often preferable over conventional open racks for a variety of reasons. For example, enclosed carriers protect cargo from the elements such as wind, rain, and snow, and are more secure from theft or vandalism.

There are many types of latch mechanisms used in car top carriers. However, some latch systems allow a user to think the carrier is locked when one or more of the latches are not properly engaged. An improperly latched lid may lead to theft of items stored in the carrier, and may permit the lid to pop open inadvertently when the vehicle is moving. Additionally, some latch systems are "key-blocked" and may be capable of being forced open even while a key-operated lock is in a locked position.

Examples of car top carriers including box latches are found in the following patents and published applications: U.S. Pat. Nos. 1,313,687; 3,008,177; 3,677,196; 4,217,999; 4,249,684; 4,274,568; 4,406,387; 5,419,479; 5,492,258; 5,546,705; 5,582,313; 5,762,244; 5,823,411; 5,845,828; 5,947,356; 6,145,719; 6,276,311; 6,296,161; 6,296,278; 6,463,627; 2002/0030074; DE2804588; DE19526477; WO04067326; US-2006-0032878-A1 and US-2007-0257075-A1. The patents and publications listed above are incorporated herein by reference in their entirety for all purposes.

SUMMARY

A vehicle rooftop carrier (also referred to herein as a "cargo box") has a bottom portion and a lid. The lid is hinged to the bottom to allow opening on one or more sides. In one aspect, a latch system includes a drive bar that provides a rotational connection between one or more latch assemblies. The drive bar and latch assemblies provide a system by which a cargo box lid and bottom may be securely engaged for transit and opened by a user to retrieve contents from the carrier. A lock-enabled latch may include a key-operated lock, a toggle switch, for example, an inwardly depressible button having a shaft, and a latch-enabling member mounted on and movable along the length of the drive bar by operation of the key-operated lock between a locked position where the latch-enabling member is disengaged from the button, and an unlocked position where the latch-enabling member is engaged with the toggle switch.

BRIEF DESCRIPTION OF THE DRAWINGS

FIG. 9 shows a side view of an isolated trigger and latch clasp in the un-latched position.

FIG. 10 shows a side view of a trigger and latch clasp for use in a latch system in the latched position

FIG. 12 shows a partial cut away view of a control and drive assembly on a cargo box, in a locked or non-enabled position.

FIG. 13 shows a partial cut away view of the control and drive assembly shown in FIG. 12, switched to the unlocked or enabled position.

FIG. 14 shows a partial cut away perspective view of the control and drive assembly shown in FIGS. 12 and 13, in a drive mode for initiating unlatching and opening of a cargo box.

DETAILED DESCRIPTION

This disclosure provides numerous selected examples of invented devices for carrying cargo on or with a vehicle. Many alternatives and modifications which may or may not be expressly mentioned are enabled, implied, and currently possessed, as supported by the disclosure below and the drawings.

Figure 1:
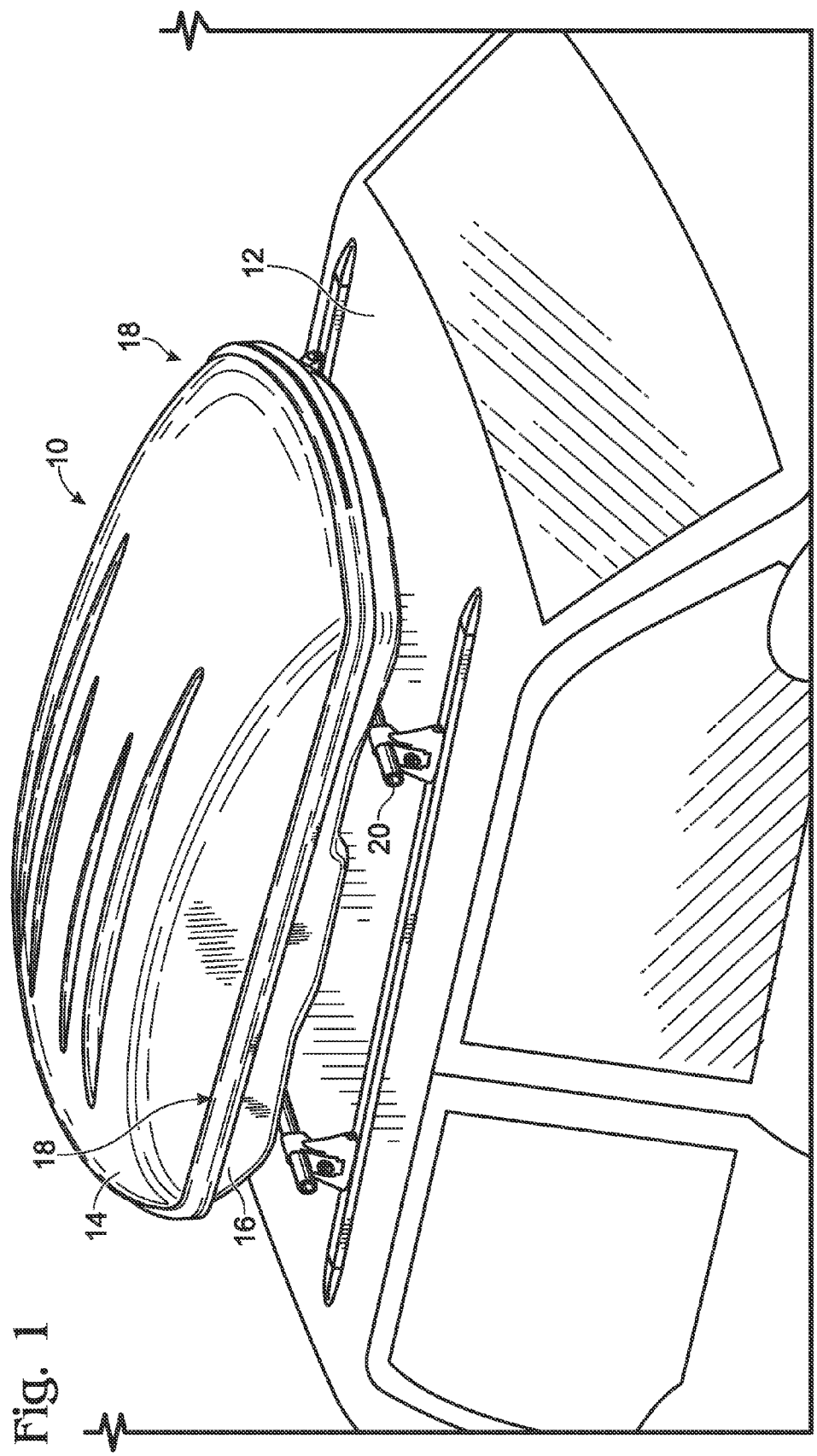
FIG. 1 shows a perspective view of a car top carrier attached to the top of a vehicle.

FIG. 1 shows car top carrier 10 mounted on vehicle 12. Carrier 10 includes top portion 14 and bottom portion 16 and opposing lateral sides 18. Clamp devices (not shown) are used to attach bottom portion 16 of carrier 10 to crossbars 20 mounted to the top of vehicle 12.

Figure 2:
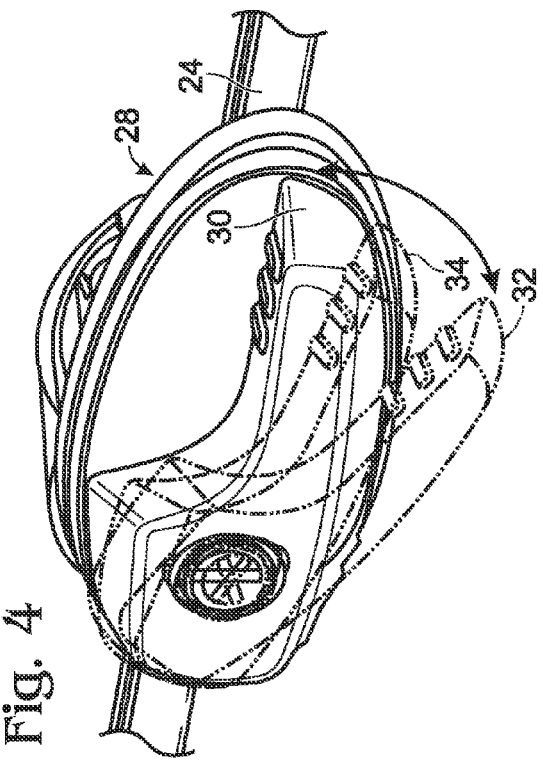
FIG. 2 shows an end view of a car top carrier opened alternately from opposing sides.

FIG. 2 shows an end view of carrier 10 opened alternately from opposing sides 18. Carrier 10 may be opened by a user from a first side and pivot about the opposing side. This feature of carrier 10 is made possible by dual-functioning hinge/latch mechanisms such as the examples described in detail below.

Figure 3:
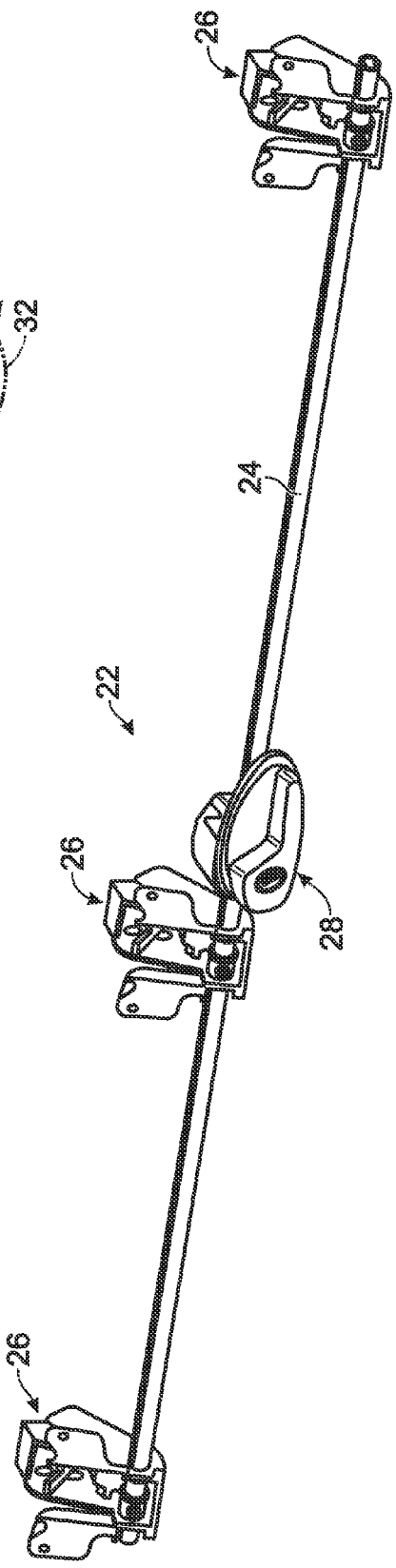
FIG. 3 shows a perspective view of a latch system for use in a car top carrier.

FIG. 3 illustrates latch system 22 for use in carrier 10. Latch system 22 includes a drive bar 24 that connects one or more latch assemblies 26 and a handle assembly 28. Latch system 22 is configured to be attached to the inside portion of carrier 10 along one of sides 18 via screws, rivets, or other appropriate fasteners. As described below, portions of handle assembly 28 may be accessible from the exterior of carrier 10 so as to be accessible to a user. Latch system 22 provides a system by which top portion 14 and bottom portion 16 of carrier 10 may be securely engaged for transit and opened by a user to retrieve contents from carrier 10.

Figure 4:
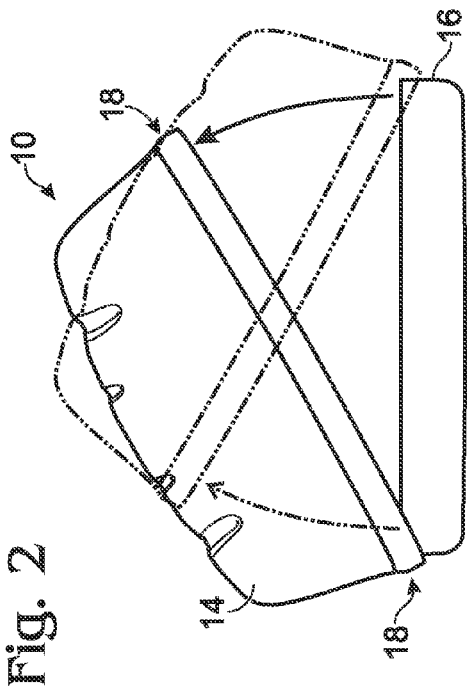
FIG. 4 shows a perspective view of a handle assembly, wherein the handle alternately indicates that the car top carrier is latched, un-latched, and not fully latched.

FIG. 4 shows a detailed view of handle assembly 28 from latch system 22 of FIG. 3. Handle assembly 28 is shown rotating between three positions—closed 30, open (or "released") 32, and intermediate (or "partially released") 34 positions. Each of the three positions may indicate a different status of latch system 22. Handle assembly 28 may also function as an indicating device. For example, closed position 30 may indicate latch system 22 is in the fully latched position, meaning carrier 10 is closed and latched; open position 32 may designate that carrier 10 is open and unlatched; and intermediate position 34 may indicate that one or more latch assemblies 26 are latched, but the carrier is not completely engaged or locked.

Figure 5:
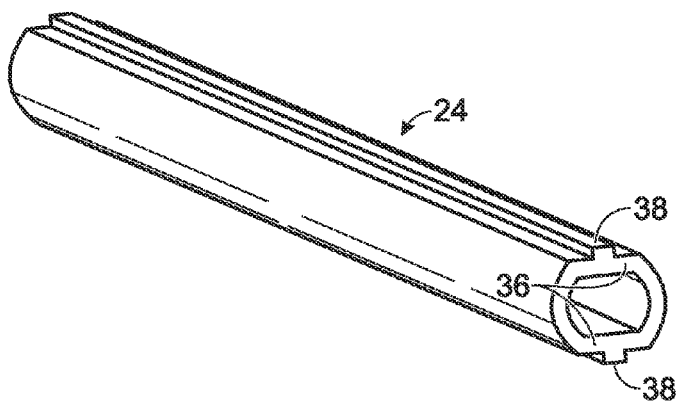
FIG. 5 shows a perspective view of a drive bar for use in a latch system.

FIG. 5 shows drive bar 24 illustrated in FIGS. 3 and 4. Drive bar 24 may provide a rotational connection between one or more latch assemblies 26 and handle assembly 28. Drive bar 24, as shown, may be an elongate tube formed of metal or other rigid material. As shown in FIG. 5, drive bar 24 may include opposing flat portions 36 and tabs (ridges, or spines) 38 formed in the tube. Such a structure may permit latch assemblies 26 and handle assembly 28 to slide or adjust along drive bar 24 due to expansion and contraction due to fluctuations in temperature, while reliably and effectively translating pivotal rotation between latch assembly 26 and handle assembly 28.

Figure 6:
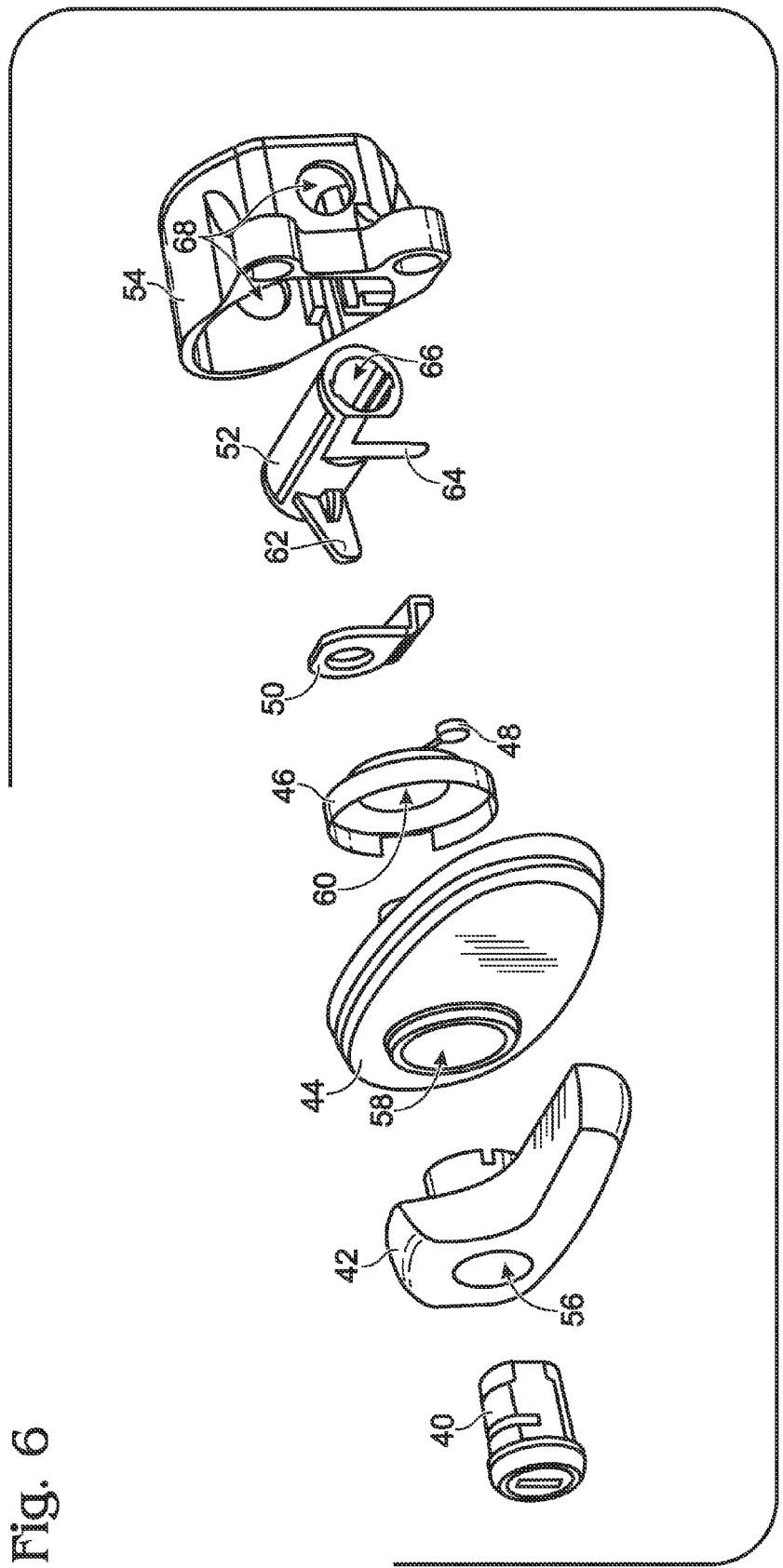
FIG. 6 shows an exploded view of a handle assembly for use in a latch system.

FIG. 6 shows an exploded view of handle assembly 28. Each component of handle assembly 28 is shown in the latched position, meaning carrier 10 is closed. Handle assembly 28 includes lock 40, handle 42, handle base 44, handle driver 46, handle spring 48, lock cam 50, bar driver 52, and lock cover or housing 54. The components of handle assembly 28 function to impart rotational movement on drive bar 24 when handle 42 is manipulated, specifically rotated. The components, their function, and interaction with one another are discussed in detail below.

Lock 40 of FIG. 6 may lock and unlock carrier 10 using a key. When lock 40 is in the locked position, handle assembly 28 is prohibited from rotating and carrier 10 cannot be opened using handle assembly 28. However, when lock 40 is in the unlocked position, handle assembly 28 operates in the manner described in detail below. In some embodiments, the key may not be removed from lock 40 unless handle assembly 28 is in closed position 30. This feature prevents a user from unknowingly leaving carrier 10 open.

As shown in FIG. 6, lock 40 is disposed in a cavity or channel 56 formed in handle 42. Users may rotate handle 42 to unlatch and open carrier 10. Handle 42 interacts with other components of handle assembly 28 to impart rotational movement of drive bar 24. The rotational movement imparted on drive bar 24 is thereafter translated to latch assembly 26 which causes carrier 10 to open or close. The manner in which handle assembly 28 rotates drive bar 24 will be appreciated with consideration of the description below. Handle 42 also may indicate whether carrier 10 is fully latched or un-latched. As noted above, the location of handle 42—open position 30, closed position 32, or intermediate position 34—indicates the current status of carrier 10.

When handle assembly 28 is fully assembled, lock 40 and handle 42 extend through an aperture 58 defined in handle base 44. Handle base 44 is connected to the exterior of carrier 10 making handle 42 and lock 40 accessible from the exterior of carrier 10. Aperture 58 may align with an opening in carrier 10 (not shown) such that lock 40 and handle 42 may extend into the interior of carrier 10 to interact with components of handle assembly 28 disposed therein.

Handle driver 46 connects to handle 42 via aperture 58 defined in handle base 44 and carrier 10. Handle 42 is fixedly attached to handle driver 46 such that handle driver 46 translates rotation of handle 42 to components disposed within carrier 10. For example, when a user rotates handle 42, handle driver 46 rotates correspondingly.

Handle spring 48 is connected to handle driver 46. Handle spring 48 is oriented so as to bias handle driver 46 toward the open or un-latched position. The biasing force imparted by handle spring 48 may be translated to handle 42 via the connection between handle driver 46 and handle 42.

Lock cam 50 is connected to lock 40 through channel 56 in handle 42 and apertures 58 and 60 defined in handle base 44 and handle driver 46, respectively. Lock cam 50 prevents handle 42 from rotating when lock 40 is in the locked position, thus preventing a user from opening carrier 10 using handle assembly 28. However, when lock 40 is in the unlocked position, lock cam 50 rotates when handle 42 is rotated by a user. Additionally, when handle 42 is in the un-latched position, lock cam 50 may not fully rotate back to the locked position, thereby preventing handle 42 from returning to the locked position.

Bar driver 52 includes lateral tab 62, down tab 64, and channel 66 through which drive bar 24 may extend. Bar driver 52 is configured to impart pivotal rotation on drive bar 24 when handle 42 is turned by a user. As will be appreciated with the description below, the rotation imparted on drive bar 24 is then translated to latch assembly 26 to open carrier 10. Bar driver 52 is rotated by contact from lock cam 50 on lateral tab 62 when handle 42 is rotated by a user. The rotation forced by lock cam 50 causes lateral tab 62 and down tab 64 to rotate upward. Down tab 64 is positioned such that lock cam 50 cannot rotate back to the latched position until bar driver 52 is rotated back to the latched position. Bar driver 52 is rotated back to the latched position when latch assembly 26—described below with reference to FIGS. 7 and 8—is closed by a user.

Lock cover or housing 54 houses each of the components of handle assembly 28 disposed inside carrier 10. Lock cover 54 may be fastened to the interior or bottom portion 16 of carrier 10. Opposing apertures 68 are formed in lock cover 54 to provide bearing surfaces for drive bar 24. Apertures 68 may align with channel 66 in bar driver 52 when handle assembly 28 is fully assembled.

Figure 7:
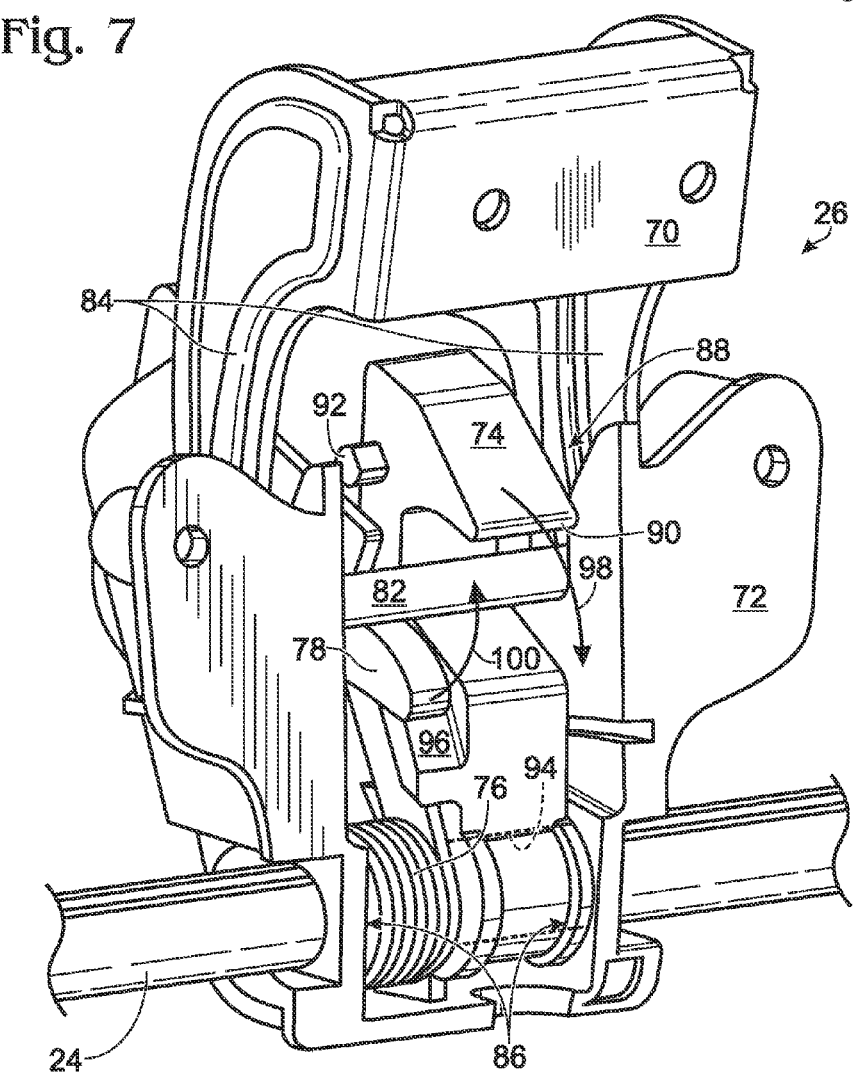
FIG. 7 shows a perspective view of an isolated latch in the latched position for use in a latch assembly.

FIG. 7 shows latch assembly 26 in detail. Multiple latch assemblies 26 may be incorporated into latch system 22 and may be integrated on each opposing side 18 of carrier 10. Latch assembly 26 is a dual-function latch and hinge which permits top portion 14 and bottom portion 16 to attach and rotate relative to one another. Latch assembly 26 includes latch catch 70, latch housing 72, latch clasp 74, clasp spring 76, trigger 78, and trigger spring (not shown). As illustrated in FIG. 7, latch assembly 26 is shown in the latched or closed position.

Latch catch 70, as shown in FIG. 7, may be fastened to the inside of top portion 14 of carrier 10. Latch catch 70 includes a latch catch pin 82 that extends between opposing brackets 84. Latch catch pin 82 provides a structure by which latch clasp 74—described below—may engage to latch top portion 14 and bottom portion 16. Additionally, latch catch pin 82 is formed so as to permit pivotal rotation between top portion 14 and bottom portion 16 when engaged.

Latch housing 72 may provide a protective housing for the other components of latch assembly 26 and may be fastened to the inside of bottom portion 16 of carrier 10. The interior of latch housing 72 may provide bearing surfaces for drive bar 24 and trigger 78. As shown in FIG. 7, drive bar 24 may extend though opposing apertures 86 defined in latch housing 72, thus connecting latch assembly 26 to handle assembly 28. Latch housing 72 also includes opposing guides 88—shown in greater detail in FIG. 8—to guide latch catch pin 82 into latch housing 72 when a user is closing carrier 10.

Latch clasp 74 is housed within latch housing 72 and includes hook portion 90 and pin knob 92. As shown in FIG. 7, when latch assembly 26 is in the latched position, hook portion 90 engages latch catch pin 82. Hook portion 90 prevents latch catch pin 82 from disengaging, which would cause carrier 10 to open. Pin knob 92 interacts with trigger 78—as described in detail below—to prevent latch clasp 74 from moving forward to prematurely engage latch catch pin 82.

Latch clasp 74 also includes a channel 94 that aligns with apertures 86 defined in latch housing 72. Drive bar 24 may extend through apertures 86 and channel 94. Channel 94 may be formed such that latch clasp 74 may slide along drive bar 24 while not rotating about it. This connection to drive bar 24 provides the pivotal rotation connection with handle assembly 28. When latch assembly 26 is in the latched position—as shown in FIG. 7—drive bar 24 causes bar driver 52 and other components of handle assembly 28 to rotate to the latched position. Conversely, when a user rotates handle 42 to open carrier 10, bar driver 52 rotates drive bar 24 and consequently latch clasp 74 to the open position—shown in FIG. 8—releasing latch catch pin 82.

Clasp spring 76 is disposed about drive bar 24. Clasp spring 76 contacts the interior wall of latch housing 72 at one end and a tab 96 formed on latch clasp 74 at the other end. The orientation of clasp spring 76 biases latch clasp forward in the direction shown by directional arrow 98.

As noted above, trigger 78 interacts with pin knob 92 to prevent latch clasp from moving forward until latch catch pin 82 is sufficiently forced into latch assembly 26. Trigger 78 is rotationally attached to the interior wall of latch housing 72. When latch catch pin 82 is forced into latch housing 72 by a user closing carrier 10, latch catch pin 82 first contacts the distal end of trigger 78. As latch catch pin 82 is forced downward, trigger 78 also pivots downward. When latch catch pin 82 is forced downward to the point at which it clears hook portion 90 of latch clasp 74, pin knob 92 is released and the bias provided by clasp spring 76 causes latch clasp 74 to rotate forward to capture latch catch pin 82.

A trigger spring, which is not shown, biases trigger 78 upward in the direction shown by directional arrow 100. The biasing provided by the trigger spring causes latch catch 70 and consequently top portion 14 of carrier 10 to "pop" open when opened. The trigger spring also provides the force that holds pin knob 92 in place until trigger 78 has been sufficiently rotated.

Figure 8:
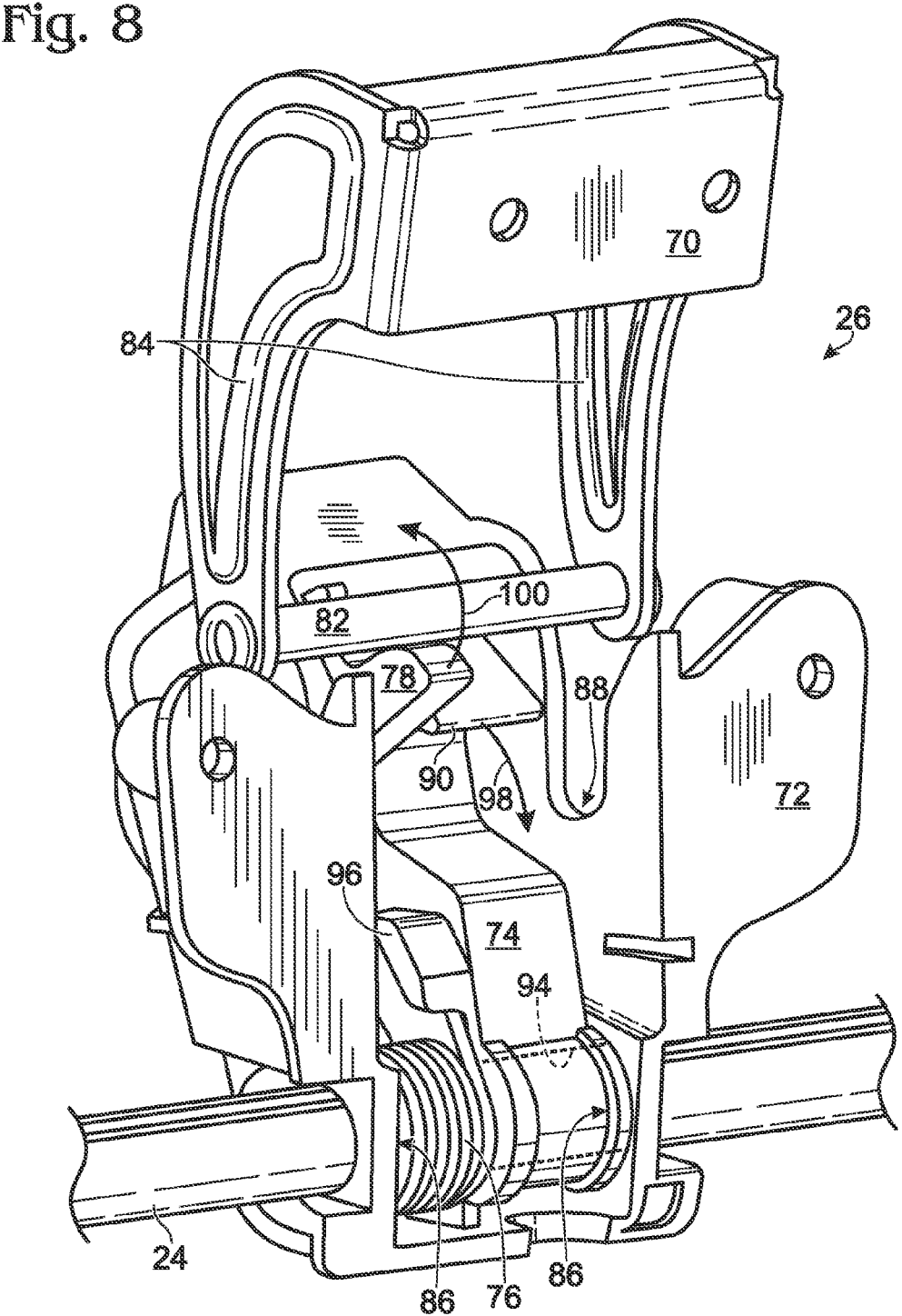
FIG. 8 shows a perspective view of the latch of FIG. 7 for use in a latch assembly.

FIG. 8 shows latch assembly 26 of FIG. 7 in the un-latched or open position. As seen in FIG. 8, latch clasp 74 has disengaged latch catch pin 82 permitting it to be lifted from latch assembly 26. Latch catch pin 82 is shown resting on the upper side of trigger 78 which is forcing latch catch pin 82 upward due to the biasing provided by the trigger spring. Latch clasp 74 is held in the back or disengaged position by a hook 102 (FIGS. 9 and 10) formed in trigger 78 that engages pin knob 92 on latch clasp 74.

It should be appreciated that in latch system 22 incorporating multiple latch assemblies 26, carrier 10 will not close unless each latch assembly 26 is fully latched. Specifically, handle 42 will not rotate to closed position 30 until drive bar 24 rotates back to the closed position. Because drive bar 24 is connected to each latch assembly (three per side, for example) 26 incorporated in latch system 22, drive bar 24 will not rotate until each latch clasp 76 has either (1) engaged latch catch pin 82 to close carrier 10, or (2) released latch catch pin 82 to open carrier 10.

FIGS. 9 and 10 show a cross-sectional side view of the interaction between latch clasp 74 and trigger 78. FIG. 9 illustrates latch assembly 26 in the un-latched or disengaged position. FIG. 10 shows latch assembly 26 in the latched or fully engaged position. FIGS. 9 and 10 also show trigger pivot axis 104 and latch catch pivot axis 106 along with directional arrows 108 and 110 indicating the direction in which trigger 78 and latch clasp 74 are biased. The cross-hatched portion of trigger 78 indicates raised contours formed in the side of trigger 78. Specifically, the raised contours form hook 102 that interacts with pin knob 92 to hold back or release latch clasp 74 to engage latch catch pin 82.

FIG. 9 shows latch catch pin 82 initially contacting the upper surface of trigger 78. As latch catch pin 82 is forced downward, pin knob 92 moves upward relative to hook 102 on trigger 78. Hook 102 and pin knob 92 are formed such that pin knob 92 is fully released when latch catch pin 82 clears the distal end of hook portion 90 formed in latch clasp 74. As pin knob 92 is released from hook 102, latch clasp 74 moves forward to engage latch catch pin 82 because of the biasing provided by clasp spring 76. Pin knob 92 slides along a rail 112 formed in trigger 78 until latch clasp 74 eventually engages latch catch pin, as shown in FIG. 10.

Figure 11:
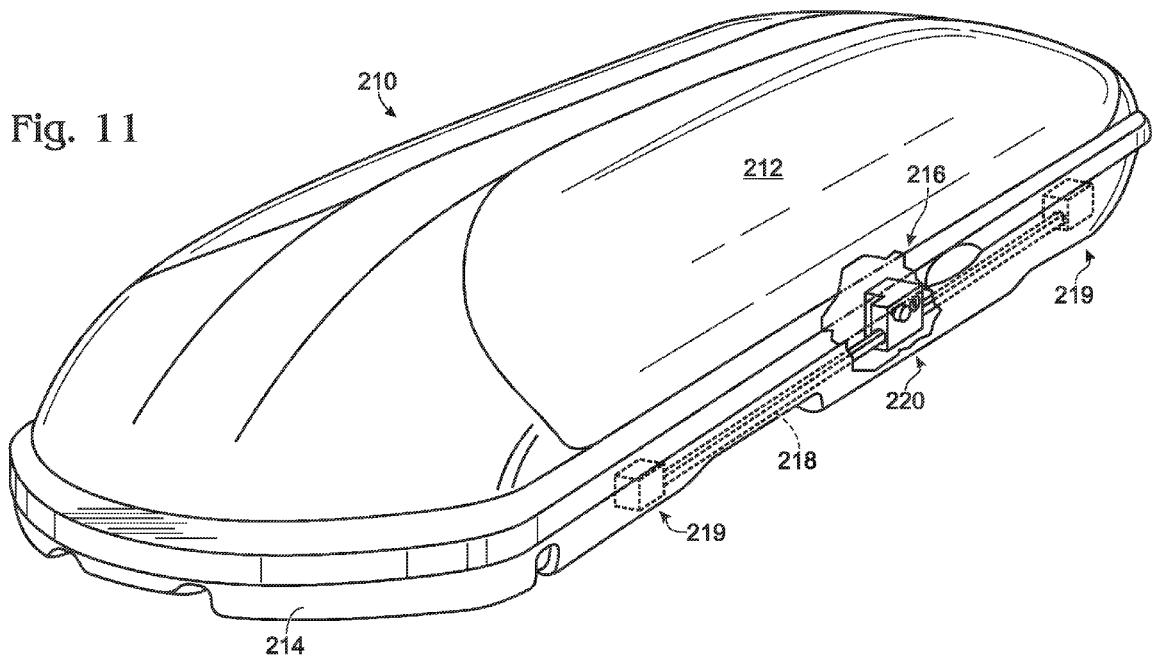
FIG. 11 shows a perspective view of a cargo box, partially cut away to show a control assembly and a drive bar shown in dashed lines.

Referring now to FIG. 11, a carrier 210 includes a lid 212 and a bottom 214. Lid 212 and bottom 214 may be releasably securable to one another using various mechanisms, such as those described in the patents and patent applications incorporated herein.

In FIG. 11, latch system 216 includes drive bar 218 that provides a rotational connection between one or more latch assemblies 219. Drive bar 218 and latch assemblies 219 provide a system by which lid 212 and bottom 214 may be securely engaged for transit and opened by a user to retrieve contents from carrier 10, as described above in other examples.

A user may selectively lock and unlock latch system 216 of carrier 210 by operating lock-enabled latch 220. Referring now to FIG. 12, lock-enabled latch 220 includes housing 222 in which key-operated lock 224 is mounted. Drive bar 218 extends through housing 222, and a latch-enabling member, sleeve, or follower 226 is mounted on and movable along the length of drive bar 218.

Latch-enabling member 226 includes elongate portion 228 with inner lumen 230 through which drive bar 218 extends. Latch-enabling member 226 also includes radial extension 232 that includes detent 34 shaped to receive shaft 236 or other portion of toggle switch or button 238. As will be described below, latch-enabling member 226 may be moved along drive bar 218 so that detent 234 of radial extension 232 engages shaft 236 of button 238, in order to allow lock-enabled latch 220 to be operated unlatching lid 212 from bottom 214 of carrier 210.

Latch-enabling member 226 includes lock-engaging extension 240 that defines elongate aperture 242 along its length. Aperture 242 may be sized to receive cam portion 244 of key-operated lock 224. As seen in FIG. 13, when a key (not shown) is inserted into key-operated lock 224 and turned in the direction shown by arrow 246, cam 244 rotates, which causes latch-enabling member 226 to move along drive bar 218 in the direction of arrow 248 toward button 238 so that detent 234 of radial extension 232 engages shaft 236 of button 238, thereby permitting lid 212 to be disengaged from bottom 214 of carrier 210.

As shown in the example illustrated in FIGS. 12-14, button 238 may be pressed inward regardless of whether follower 226 is engaged or disengaged with shaft 236. However, the affect of pressing button 238 on the drive bar and clasps differs depending on whether follower is engaged with the shaft. The button will only interact with the drive bar if the lock is in the unlocked position and the follower is in the engaged position. This feature makes it virtually impossible to force the latches open by pressing the button when the follower is in the disengaged position. As shown in FIG. 14, while detent 234 is engaged with shaft 236, a user is able to depress button 238 in the direction of arrow 250. Button 238 then pushes radial extension 232 inward, rotating latch-enabling member 226 in the direction of arrows 252 which then causes simultaneous unlatching of clasps 219 using principals described above with respect to other examples.

While embodiments of a box latch system have been particularly shown and described, many variations may be made therein. This disclosure may include one or more independent or interdependent inventions directed to various combinations of features, functions, elements and/or properties, one or more of which may be defined in the following claims. Other combinations and sub-combinations of features, functions, elements and/or properties may be claimed later in this or a related application. Such variations, whether they are directed to different combinations or directed to the same combinations, whether different, broader, narrower or equal in scope, are also regarded as included within the subject matter of the present disclosure. Accordingly, the foregoing embodiments are illustrative, and no single feature or element, or combination thereof, is essential to all possible combinations that may be claimed in this or a later application. Each claim defines an invention disclosed in the foregoing disclosure, but any one claim does not necessarily encompass all features or combinations that may be claimed. Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

The various structural members disclosed herein may be constructed from any suitable material, or combination of materials, such as metal, plastic, nylon, plastic, rubber, or any other materials with sufficient structural strength to withstand the loads incurred during use. Materials may be selected based on their durability, flexibility, weight, and/or aesthetic qualities.

Many useful modified combinations of the devices disclosed may be implemented. Numerous elements of the disclosed devices may be interchanged or reversed. For example, the coordinating bar connecting latch/hinge devices may be carried on the lid instead of the bottom of a carrier. For a given latch/hinge device, the trigger and latch assembly may be mounted on the lid with a corresponding pin mounted on the bottom of a carrier. Any number of latch/hinge devices may be engaged on a single coordinating bar. Similar latch systems to those described and illustrated may be implemented on a carrier that only opens on one side.

We claim:

1. A cargo box comprising
   an enclosure including a bottom and a lid, the enclosure having an elongate axis and first and second lateral sides parallel to the elongate axis, the bottom being equipped with a plurality of clamps configured to secure the bottom of the enclosure to a pair of crossbars on top of a vehicle,
   a hinge assembly connecting the lid to the bottom along the first lateral side of the enclosure, the hinge assembly allowing the lid to pivot around a hinge axis between open and closed positions,
   a latch assembly connecting the lid to the bottom on the second lateral side of the enclosure, the latch assembly including a plurality of clasps spaced along the second lateral side, each clasp connecting the lid to the bottom and having a latched position and an unlatched position,
   a drive bar connecting each of the clasps, the drive bar being moveable from a passive position to a drive position initiating simultaneous movement of the clasps to their unlatched positions, and
   a control assembly coupled to the drive bar, the control assembly including a toggle switch accessible from outside the enclosure, a follower connected to the drive bar and being engageable with the toggle switch, the follower being capable of a first movement which causes the drive bar to initiate movement of the clasps, and a second movement wherein the follower is moveable between an engaged position in which the follower is engaged with the toggle switch and a disengaged position in which the follower is disengaged from the toggle switch, and a lock device having a key slot accessible from the outside of the enclosure, the lock device being switchable by a key stroke between locked and unlocked positions, wherein movement of the lock device from the locked position to the unlocked position causes the follower to move from the engaged position to the disengaged position.

2. The cargo box of claim 1, wherein the toggle switch moves freely when the follower is in the disengaged position without having any interaction with the follower or the drive bar.

3. The cargo box of claim 1, wherein the toggle switch includes a button.

4. The cargo box of claim 1, wherein the toggle switch includes a lever.

5. The cargo box of claim 1, wherein the toggle switch includes a dial.

6. The cargo box of claim 1, wherein the follower includes a sleeve portion encircling the drive bar.

7. The cargo box of claim 1, wherein the drive bar has a longitudinal axis, the first movement of the follower being rotation around the longitudinal axis.

8. The cargo box of claim 1, wherein the drive bar has a longitudinal axis, the first movement of the follower being movement of the drive bar along the longitudinal axis.

9. The cargo box of claim 1, wherein the second movement of the follower is a sliding movement along the drive bar.

10. The cargo box of claim 1, wherein the clasps are capable of functioning as hinges to permit opening of the enclosure along the first lateral side of the enclosure.

11. The cargo box of claim 1, wherein the hinge assembly includes clasps like the clasps along the second lateral side allowing the enclosure to be opened from either lateral side.

12. The cargo box of claim 1, wherein the follower includes an extension portion having a slot, the lock device having a cam surface engaging the slot of the extension portion configured to cause the second movement of the follower when the lock device is switched to the unlocked position.

13. A cargo box comprising:
   a box having opposing lateral sides, a bottom portion and a lid portion pivotally connected to the bottom portion along each of the lateral sides, the box being equipped with clamp devices configured for clamping the box to a pair of crossbars on top of a vehicle, and a hinge/latch system that permits opening of the lid portion on at least one lateral side of the box, the hinge/latch system including a hinge/latch assembly on at the least one lateral side of the box, the hinge/latch assembly having a plurality of hinge/latch devices mounted along the at least one lateral side of the box, a drive bar connecting the hinge/latch devices, and a lock-enabled latch for controlling substantially synchronized release and engagement of the hinge/latch devices, wherein the lock-enabled latch includes:

a key-operated lock;

an inwardly depressible button;

a latch-enabling member mounted on and movable along the length of the drive bar by operation of the key-operated lock between a locked position where the latch-enabling member is disengaged from the button, and an unlocked position where the latch-enabling member is engaged with the button so the button is depressible to rotate the drive bar to release the hinge/latch devices, wherein the latch-enabling member includes a radial extension with a detent shaped to receive a shaft of the button.

14. The cargo box of claim 13, wherein the latch-enabling member includes a lock-engaging extension defining an elongate aperture along its length that is sized to receive a cam of the key-operated lock.

* * * * *

UNITED STATES PATENT AND TRADEMARK OFFICE
CERTIFICATE OF CORRECTION

| | | |
|---|---|---|
| PATENT NO. | : 8,905,278 B2 | |
| APPLICATION NO. | : 13/253875 | |
| DATED | : December 9, 2014 | |
| INVENTOR(S) | : John M. Elliot et al. | |

It is certified that error appears in the above-identified patent and that said Letters Patent is hereby corrected as shown below:

In the Claims

In claim 1, column 8: line 32, the word "engaged" should be changed to --disengaged--; lines 32 and 33, the word "disengaged" should be changed to --engaged--.

Signed and Sealed this
Twenty-third Day of June, 2015

Michelle K. Lee
*Director of the United States Patent and Trademark Office*